(12) United States Patent
Wilson et al.

(10) Patent No.: US 8,429,101 B2
(45) Date of Patent: Apr. 23, 2013

(54) METHOD FOR SELECTING FEATURES USED IN CONTINUOUS-VALUED REGRESSION ANALYSIS

(75) Inventors: Kevin W. Wilson, Cambridge, MA (US); Yubo Cheng, Jersey City, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 346 days.

(21) Appl. No.: 12/961,895

(22) Filed: Dec. 7, 2010

(65) Prior Publication Data
US 2012/0143799 A1 Jun. 7, 2012

(51) Int. Cl.
*G06F 15/18* (2006.01)
*G06F 17/00* (2006.01)
*G06F 7/60* (2006.01)

(52) U.S. Cl.
USPC .................................. 706/12; 706/45; 703/2

(58) Field of Classification Search ........................ None
See application file for complete search history.

(56) References Cited

U.S. PATENT DOCUMENTS

| | | | |
|---|---|---|---|
| 7,233,931 B2 | 6/2007 | Lee | |
| 7,685,080 B2 * | 3/2010 | Rifkin et al. | 706/20 |
| 2010/0005042 A1 * | 1/2010 | Saidi et al. | 706/12 |
| 2010/0094784 A1 * | 4/2010 | Varma | 706/12 |

\* cited by examiner

*Primary Examiner* — Alan Chen
(74) *Attorney, Agent, or Firm* — Gene Vinokur; Dirk Brinkman

(57) ABSTRACT

A method selects features used in continuous-valued regression analysis. Training data input to the method includes features and corresponding target values, wherein the target values are continuous, and there is one target value for each feature. Each threshold value is thresholded and discretized with respect to a threshold value to produce a discretized target value. Then, categorical feature selection is applied to the features, using the discrete target values, to produces selected features. The selected values can be used in any regression analysis.

7 Claims, 1 Drawing Sheet

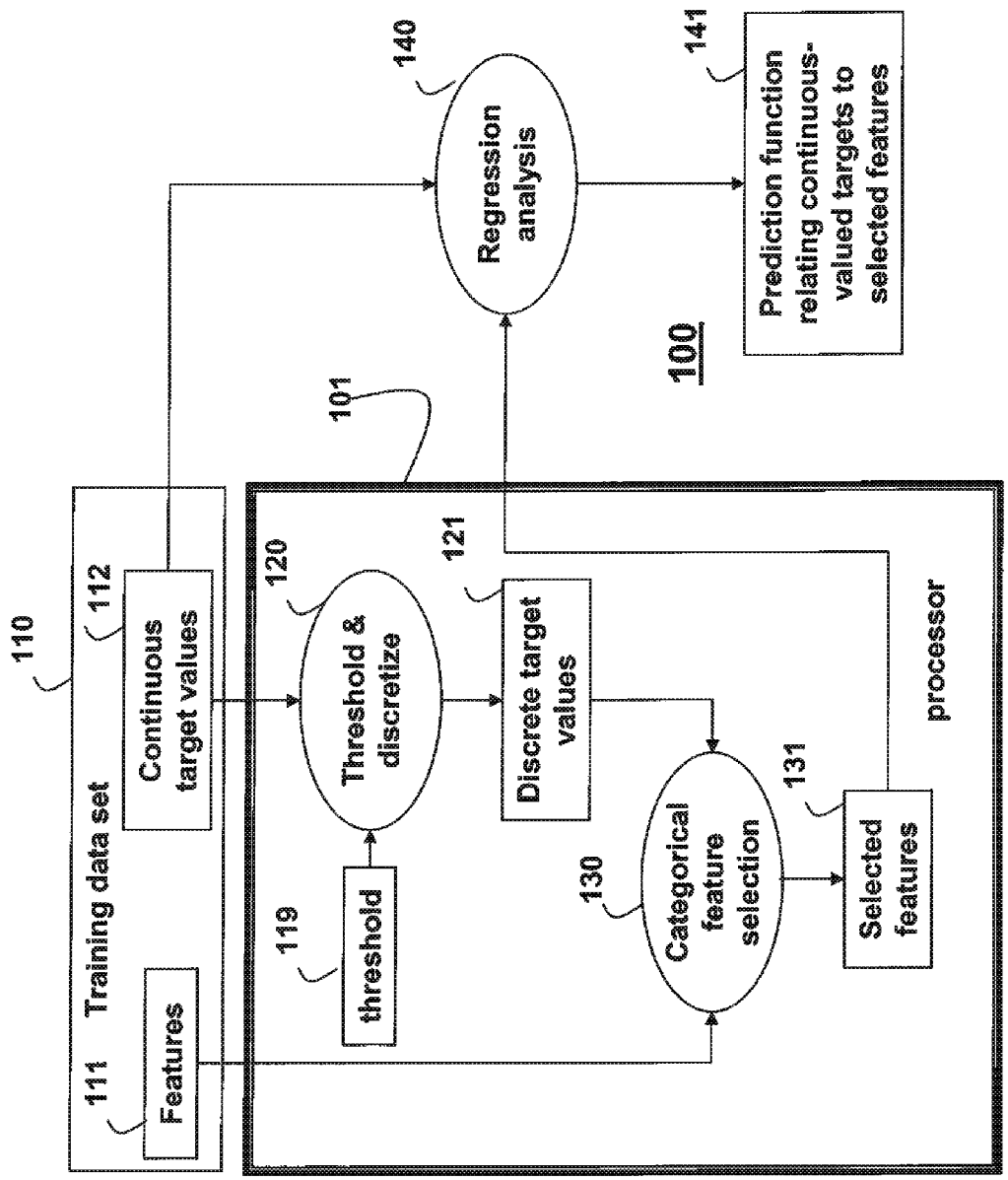

METHOD FOR SELECTING FEATURES USED IN CONTINUOUS-VALUED REGRESSION ANALYSIS

FIELD OF THE INVENTION

This invention relates generally to continuous-valued regression analysis, and more particularly to selecting a subset of features from a set of available features when performing continuous-valued regression analysis.

BACKGROUND OF THE INVENTION

Regression analysis models a relationship between a dependent variable and one or more independent variables. Regression analysis can determine how a typical dependent variable changes when any one of the independent variables is varied, while the other independent variables remain the same. Most commonly, regression analysis estimates a conditional expectation of the dependent variable given the independent variables.

Of particular interest to this invention is selecting features used in continuous-valued regression analysis. Procedures for regression analysis include neural networks, and support vector machines (SVM). Typical applications of regression analysis include time series prediction, e.g., the prediction of future values of an electrical power demand based on past values, and prediction of an unknown quantity of interest based on available measurements, e.g., the prediction of a person's lifespan based on measurements of height, weight, blood pressure, and hair length, for example.

Feature selection determines a subset of the available features used in regression analysis. In the above example of an application for predicting lifespan, the subset of useful features can include height, weight, and blood pressure, while hair length is not useful. In this application, the feature selection procedure should only select the subset of useful features, e.g. height, weight, and blood pressure, and the procedure should exclude the useless feature, e.g., hair length. By eliminating useless features, the feature selection can reduce the time for subsequent prediction. By eliminating useless features, feature selection can also improve the accuracy of subsequent predictions, and lead to models that are easier to interpret.

Many feature selection procedures use simple measures of linear dependence, such as correlation, to select useful features. Those approaches can fail when the relationships among the variables are nonlinear. Wrapper techniques greedily select a small number of features at a time by evaluating a specific, potentially nonlinear, regression analysis problem. Because wrapper techniques greedily select a small subset of the features, wrapper techniques cannot determine the best overall combination of features. Wrapper techniques are often computationally intensive, and because wrapper techniques directly incorporate a regression method as a subroutine, wrapper techniques are directly tied to that particular regression analysis method.

The well known RELIEF feature selection procedure avoids most of the undesirable properties of other feature selection methods, see generally U.S. Pat. No. 7,233,931 issued to Lee, et al. on Jun. 19, 2007, "Feature regulation for hierarchical decision learning," incorporated herein by reference. That method is not greedy, not computationally intensive, and not tied to a specific regression analysis method. However, the RELIEF procedure works only for classification and categorical problems, i.e., problems in which the dependent variable can take a value from a small set of discrete values. An example of a categorical problem would be a disease detection problem, where the dependent variable can take one of two possible values indicating presence or absence of the disease. In contrast to categorical problems, continuous-valued problems have dependent variables that can take values from an infinite set of values, for example all real numbers. In this case, we refer to the values taken on by the dependent variable as "target values."

SUMMARY OF THE INVENTION

The embodiments of the invention provide a method for selecting features for continuous-valued problems, such as continuous-valued regression analysis problems. The method is not greedy, can be applied to problems in which nonlinear relationships between features and target values exist, and the method can be used with any regression analysis method.

BRIEF DESCRIPTION OF THE DRAWINGS

FIG. 1 is a flow diagram of a method for selecting features used in continuous-valued regression analysis according to embodiments of the invention.

DETAILED DESCRIPTION OF THE PREFERRED EMBODIMENT

The embodiments of our invention provide a method for selecting features used in continuous-valued regression analysis. Feature selection for binary classification are well known, particularly the well known RELIEF method, see U.S. Pat. No. 7,233,931 above. The RELIEF method works well when there are a large number of useless features. The basic idea of the RELIEF method is to decompose an arbitrary nonlinear problem into a set of locally linear problems using local training, and then estimate the feature relevance globally in a large margin framework with the $l_1$ regularization.

The RELIEF method selects features that have nearby values that are usually in the same class. Features for which examples with nearby values do not necessarily share the same class are not selected. Because the RELIEF method examines neighboring features from the same class, or from different classes, it naturally applies to binary classification.

However, the RELIEF method does not apply to continuous-valued regression analysis. Therefore, an object of the invention is to adapt the RELIEF method to continuous-valued regression analysis.

One previous attempt to adapt the RELIEF method to continuous-valued regression analysis locally estimates a rate of change of a target value with respect to the feature values, and selects features for which changes in the feature value has a predictable relationship to the change in target value, see U.S. Pat. No. 7,233,931. That approach works in some situations, but it can be very sensitive to a size of the neighborhood selected for estimating relationships between features and target values.

In our method as shown in FIG. 1 and described in greater detail below, we categorize the continuous output into categorical discrete-valued output 121. Our method thresholds 120 the continuous-valued target values y, at one or more threshold values $y_m$. The threshold values define two or more classes into which the target values are partitioned.

Selecting a single threshold value $y_m$ to be a median of the target values in a training data set 110 results in balanced classes, i.e., the number of examples in each class are substantially the same. Other threshold values can be selected based on application-specific knowledge.

For the case of a single threshold value, we define a first class and a second class as $$y' = \begin{cases} 1 & \text{if } y < y_m \\ 2 & \text{if } y \geq y_m, \end{cases}$$

where y' is a discrete class label.

Selecting $y_m$ to be the median value of target values y over the training set is usually a good threshold value because this guarantees that the number of examples of the first class is substantially the same as the number of examples of the second class.

After performing the thresholding to assign a binary class, the class values 121 can be used along with the feature values 111 in the logistic RELIEF method, or in any other categorical feature selection method.

Nonlinear Regression Analysis Method

After feature selection has been performed, the selected features can be used as input to a regression analysis method 140. Our feature selection method can select features with nonlinear relationships to the predicted value. Therefore, it is natural to use a nonlinear regression analysis method with the selected features.

Regression Analysis

In our regression analysis is a heteroscedastic (having differing variances) support vector regression with least absolute deviation and $l_1$ regularization, the set of training data $\mathcal{D}$ 110 includes is a set of M pairs $$\mathcal{D} = \{(X_1, Y_1), \ldots, (X_M, Y_M)\} \subset X \times \mathcal{R},$$

where X denotes a space of input patterns, e.g., $X = \mathbb{R}^d$.

Each pair includes an input vector $X_i$, and a target output value $y_i$. A function $\hat{Y} = F(X)$ estimates the target output $y_i$ from the corresponding input vector $X_i$. The target output is determined from the training data set 110.

Our regression analysis is trained by solving the following optimization problem $$\min_{W, \beta, b, \sigma, \xi, \xi^*} \lambda \|W\|_1 + \frac{1}{2} \beta^T (K + \Delta) \beta + C \sum_i (\xi_i + \xi_i^* + \epsilon_i)$$

$$\text{s.t. } Y_i - (W^T X_i + \beta^T K_i + b) \leq \epsilon_i + \xi_i^*,$$

$$(W^T X_i + \beta^T K_i + b) - Y_i \leq \epsilon_i + \xi_i,$$

$$= \quad \xi_i^*, \xi_i, \epsilon_i \geq 0, \forall i.$$

where $\xi_i$ and $\xi^*_i$ are slack variables, i.e. the variables that indicate the degree of misclassification, e is an error tolerance, $\lambda$ is a parameter that controls a strength of the $l_1$ regularization, i.e., the relative importance of minimizing the $l_1$ norm of W compared to minimizing the training error, W is a linear coefficient vector, K is a kernel matrix, $\beta$ is a coefficient vector for the kernel matrix, and C is a parameter that controls a goodness of fit.

The label for a new test example is estimated according to a prediction function $$\phi''(X) = W^T X + \sum_i \beta_i K(X_i, X) + b.$$

The linear term in the prediction function is helpful when highly correlated features, i.e., features with a strong linear relationship with the dependent variable, exist in the training data. The nature of nonlinear kernel term in our regression analysis has complementary role by exploiting nonlinear relationships between the features and the dependent variable.

Method for Feature Selection for Continuous-Values Regression

Our method uses:

1. A feature selection method that can also be applied to categorical data. We refer to this as the "categorical feature selection method." In our implementation, we use a variant of RELIEF as our feature selection method for categorical data.

2. A regression analysis method. In our implementation, we use heteroscedastic support vector regression with least absolute deviation and $l_i$ regularization.

FIG. 1 shows our method 100 for selecting features for continuous-valued regression analysis. The method can be performed in a processor 101 including memory and input/output interfaces as known in the art.

Input to the method is training data 110. The training data includes features 111 and corresponding continues target values y 112.

The continuous-valued target values y are thresholded and discretized 120 at one or more threshold values $y_m$ 119 to produce discrete target values 121. The threshold values define two or more classes into which the target values can be partitioned.

One of the threshold values is selected as the median of the target values to result in two balanced classes. Other thresholds can be selected based on application-specific knowledge.

Categorical feature selection 130 is applied to the features 111 using the discrete-values targets 121 to produces selected features 131.

The selected features 131 and the continuous target values 111 are input the regression analysis method 140 to produce a prediction function 141 relating the continuous-values targets to the selected features.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting features used in continuous-valued regression analysis, comprising the steps of:
   providing a training data set as input, wherein the training data set includes features and corresponding target values, wherein the target values are continuous, and there is one target value for each feature;
   thresholding and discretizing each target value with respect to a threshold value to produce a discretized target value; and
   applying categorical feature selection to the features using the discretized target values to produces selected features, wherein the steps are performed in a processor.

2. The method of claim 1, further comprising:
   performing continuous-valued regression analysis using the selected features.

3. The method of claim 1, wherein the thresholding and discretizing is with respect to one or more threshold values into which the target values are partitioned.

4. The method of claim 3, further comprising:
selecting a single threshold value to be a median of the target values in a training data set to results in balanced classes.

5. The method of claim 2, wherein the one or more threshold values are based on application-specific knowledge.

6. The method of claim 1, wherein the regression analysis is nonlinear.

7. The method of claim 1, wherein the regression analysis is a heteroscedastic support vector regression with least absolute deviation and $l_1$ regularization.

* * * * *